United States Patent [19]
Light

[11] Patent Number: 5,893,442
[45] Date of Patent: Apr. 13, 1999

[54] HEAVY DUTY VISCOUS FAN DRIVE AND BRACKET MOUNTING ASSEMBLY THEREFOR

[75] Inventor: Gerard M. Light, Marshall, Mich.

[73] Assignee: Eaton Corporation, Cleveland, Ohio

[21] Appl. No.: 08/831,549

[22] Filed: Apr. 9, 1997

[51] Int. Cl.$^6$ ................................................. F16D 35/02
[52] U.S. Cl. ........................................ 192/58.61; 192/58.5
[58] Field of Search ........................ 192/58.61, 58.63, 192/58.8, 82 T, 115, 58.5; 123/41.12

[56] References Cited

U.S. PATENT DOCUMENTS

| | | | |
|---|---|---|---|
| 3,262,528 | 7/1966 | Weir | 192/58 |
| 4,305,491 | 12/1981 | Rohrer | 192/58 B |
| 4,351,425 | 9/1982 | Bopp | 192/58.61 |
| 4,355,709 | 10/1982 | Light | 192/58.61 |
| 4,667,791 | 5/1987 | Martin et al. | 192/58 B |
| 5,025,906 | 6/1991 | O'Neil et al. | 192/58.61 |
| 5,452,782 | 9/1995 | Inoue | 192/58 B |
| 5,499,706 | 3/1996 | Kawada | 192/58.4 |
| 5,501,183 | 3/1996 | Takayama | 123/41.12 |
| 5,558,192 | 9/1996 | Muhlbach et al. | 192/58.61 |
| 5,722,523 | 3/1998 | Martin | 192/58.61 |

*Primary Examiner*—Rodney H. Bonck
*Assistant Examiner*—Saúl J. Rodríguez
*Attorney, Agent, or Firm*—L. J. Kasper

[57] ABSTRACT

A fluid coupling device (11) of the type including an input coupling member (35) having a cover member (49), which together define a reservoir (51) disposed within the input. The cover member (49) defines a fill port, through which flow is controlled by means of a valve arm (55). The input coupling (35) cooperates with a housing (41) and cover (43) (which comprise the output coupling) to define an operating chamber (47). Discharge fluid is pumped from the operating chamber through passages (63) and (65) to a passage (67) disposed approximately on the axis of rotation (A) of the coupling device. The passage (67) is defined by a cylindrical portion (69) which extends through an opening (71) in the cover member (49). Thus, discharge flow is communicated back into the reservoir (51) at the axis, and after the vehicle engine and fan drive have been shut down for a period of time, fluid does not bleed back from the reservoir into the operating chamber.

7 Claims, 2 Drawing Sheets

5,893,442

HEAVY DUTY VISCOUS FAN DRIVE AND BRACKET MOUNTING ASSEMBLY THEREFOR

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to viscous fan drives for driving radiator cooling fans, and more particularly, to such fan drives which are especially adapted for heavy duty applications.

Viscous fluid couplings have been used as fan drives (i.e., to drive the radiator cooling fan of an internal combustion engine) for many years. The primary reason for using a viscous fan drive, rather than a direct, mechanical drive of the fan, is to reduce the amount of horsepower consumed by the radiator cooling fan.

Initially, viscous fan drives were utilized on automobiles, and in more recent years, have also been used on light trucks. In either case, as is well known to those skilled in the art, a viscous fan drive is typically used only on a "north-south" engine, i.e., an engine having its axis oriented in the direction of travel of the vehicle.

Traditionally, larger vehicles such as class 8 trucks, being equipped with diesel engines, have utilized radiator cooling fans driven by an ON-OFF clutch, such as a pneumatically actuated friction clutch. In such a clutch, the output is driven either at the speed of the input ("ON"), or is disengaged and is not driven at all by the input ("OFF").

Although such ON-OFF clutches for heavy duty applications have been generally satisfactory, such clutches do have certain inherent limitations. It is now considered desirable by some of the vehicle manufacturers and fleet owners to be able to "modulate" the radiator cooling fan, i.e., at certain operating conditions, to operate the fan, but at less than full input speed, with the ratio of output speed to input speed being somewhat "controllable". Such modulation cannot be achieved readily with an ON-OFF clutch of the frictional engagement type. However, such modulation can be readily achieved with a viscous coupling.

It is also considered desirable by the vehicle manufacturers and fleet owners that the control of the fan drive be of the "open-loop" type, wherein the fan speed to input speed ratio is merely selected by a relatively inexpensive actuator, rather than being of the "closed-loop" type, wherein actual fan speed is monitored and used as an input to close the control loop. A viscous coupling is also especially adapted for such open-loop control.

Unfortunately, conventional viscous fan drives have not been especially well suited for heavy duty applications for several reasons. First, typical commercial viscous fan drives include a fluid reservoir which rotates at output speed, which is acceptable for most fan drive applications. However, for heavy duty applications it is especially desirable to provide a very low idle speed, and in a viscous fan drive, if the output member (and the reservoir) rotate very slowly, it is extremely difficult to achieve engaged operation of the fan drive, for reasons well understood by those skilled in the art.

Secondly, conventional commercial viscous fan drives have not been constructed in a way which would be suitable for driving the type of large, heavy fan required to cool the radiator in a heavy duty application. This is especially true of the conventional manner of mounting the prior art fan drive, which to attach its input shaft flange to a mating flange on a shaft extending out of the engine water pump. The result is that the fan drive is mounted in a cantilever fashion, thus constituting a substantial "overhung" load. Such a mounting arrangement is acceptable in the case of a small automotive fan drive, but is totally inadequate in the case of a much larger fan drive for a class 8 truck.

BRIEF SUMMARY OF THE INVENTION

Accordingly, it is an object of the present invention to provide an improved fluid coupling device of the type which is suitable for heavy duty applications which periodically require very low idle speed.

It is a related object of the present invention to provide such an improved fluid coupling device which achieves the above-stated object, and which is suitable for driving the relatively larger and heavier fans required in heavy duty applications.

It is a further object of the invention to provide such an improved fluid coupling device whereby a truck fan drive may be provided with modulation capability, and may readily be controlled in an open-loop manner.

The above and other objects of the invention are accomplished by the provision of a fluid coupling device of the type including a first rotatable coupling member defining an axis of rotation, first enclosure means associated with the first coupling member to define a fluid operating chamber therein. A second rotatable coupling member is disposed in the fluid operating chamber and a second enclosure means is associated with the second coupling member to define a fluid reservoir chamber therein. The first and second coupling members cooperate to define a viscous shear space therebetween, and in communication with the fluid operating chamber. Input shaft means is operable to transmit input torque to the second coupling member. The second enclosure means defines a fluid fill port, and a valve arm is moveable between one position blocking fluid communication through the fill port, and another position permitting fluid communication from the reservoir chamber through the fill port to the operating chamber. An actuator means is associated with the valve arm, and with the input shaft means, to move the valve arm between the one position and the another position in response to an input signal. The first coupling member includes means operable to pump fluid from the operating chamber to the reservoir chamber in response to relative rotation between the first and second coupling members.

The improved fluid coupling device is characterized by the valve arm being disposed in the fluid reservoir chamber, and being rotatable about the axis of rotation. The means operable to pump fluid includes the first coupling member defining a discharge passage communicating fluid from the operating chamber, adjacent the outer periphery thereof, to the reservoir chamber at a location juxtaposed to the axis of rotation. In accordance with another aspect of the present invention, the fluid coupling device includes a single input shaft having the second coupling member fixed to rotate therewith. The coupling device includes a mounting bracket adapted to be fixed relative to the vehicle engine, and bearing means disposed between the mounting bracket and the input shaft. Also included is a pulley member including a portion non-rotatably fixed to the input shaft at a location disposed axially between the fluid coupling device and the mounting bracket.

DETAILED DESCRIPTION OF THE PREFERRED EMBODIMENT

Figure 1:
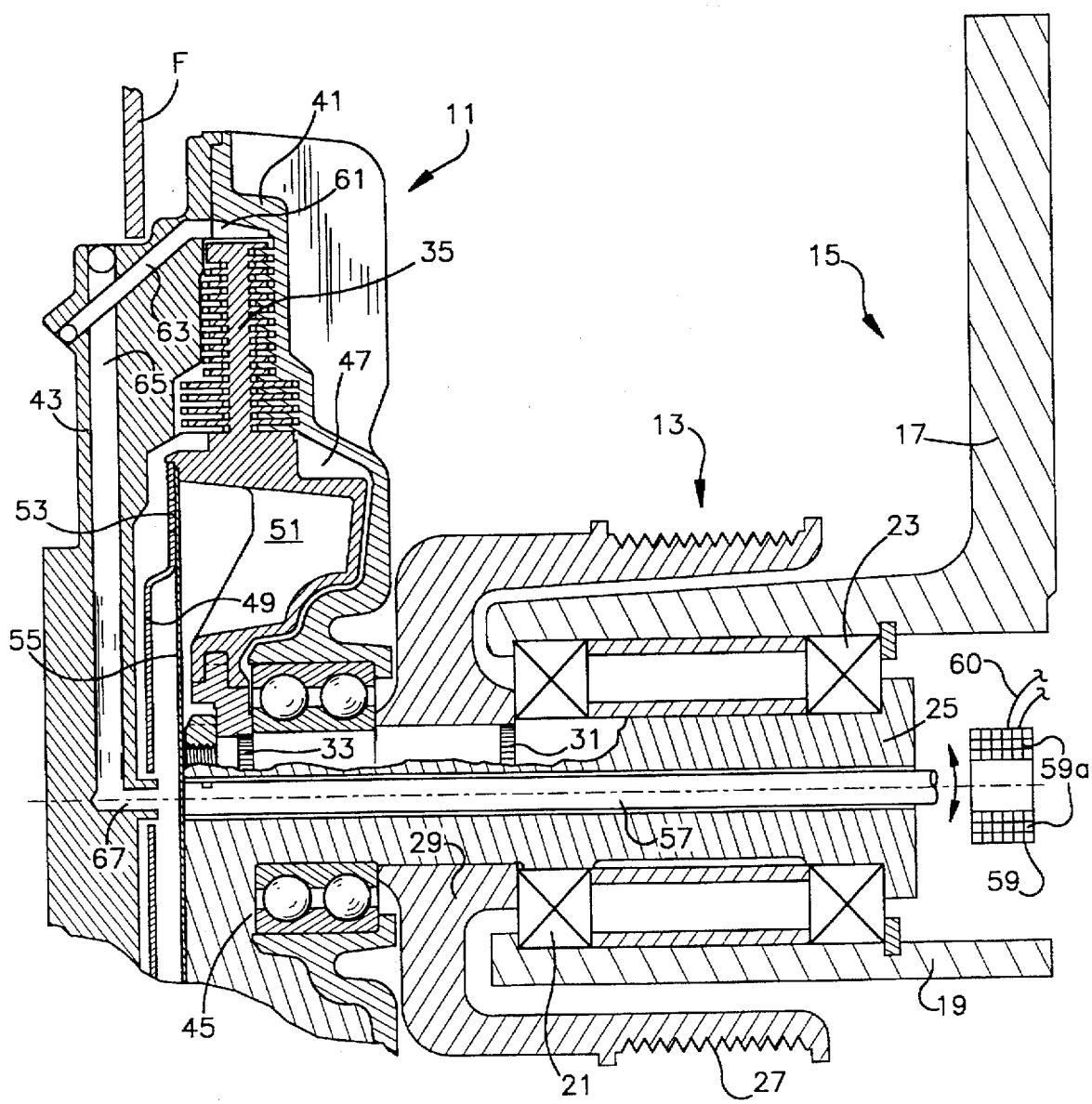
FIG. 1 is an axial cross-section of a viscous fan drive and bracket mounting arrangement therefor, made in accordance with the present invention.

Referring now to the drawings, which are not intended to limit the invention, FIG. 1 illustrates a viscous fan drive (fluid coupling) and bracket mounting arrangement which is especially suited for heavy duty applications, such as driving the radiator cooling fan for a diesel engine to be used on a vehicle such as a class 8 truck.

The fan drive arrangement shown in FIG. 1 includes a viscous fluid coupling, generally designated 11, an input drive pulley, generally designated 13, and a mounting bracket assembly, generally designated 15. However, on some occasions, the term "fluid coupling device" will be used hereinafter, and in the appended claims, to refer to the overall arrangement shown in FIG. 1.

The mounting bracket assembly 15 includes a bracket portion 17, which would typically be bolted to the cylinder block of the engine (not shown). The assembly 15 also includes a generally cylindrical shaft support portion 19 which is preferably formed integral with the bracket portion 17. Disposed within the support portion 19 is a pair of ball bearing sets 21 and 23, having appropriate spacers disposed therebetween. Rotatably supported by the bearing sets 21 and 23 is an input shaft 25, the bearing sets 21 and 23 being disposed on a rearward portion of the input shaft 25.

The input drive pulley 13 includes a generally cylindrical belt engaging portion 27 which is disposed radially about a portion of the shaft support portion 19, thus providing relatively compact packaging of the assembly. The pulley 13 further includes a hub portion 29 which is disposed about an intermediate portion of the input shaft 25, is disposed immediately adjacent the forward bearing set 21, and is pressed onto a set of serrations 31, formed about the outer surface of the input shaft 25, such as by a rolling operation or other suitable means well known to those skilled in the art. The input shaft 25 also includes a forward set of serrations 33, the function of which will be described subsequently.

The viscous fluid coupling 11 (fan drive) includes an input coupling member 35 which, in the subject embodiment, comprises a die cast aluminum member including, at its radially inner periphery, a steel insert member 37 (see FIG. 2), which is pressed onto the forward set of serrations 33, and retained thereon by means of an internally threaded nut 39.

The fluid coupling 11 further includes an output coupling assembly comprising a die cast housing member (body) 41, and a die cast cover member 43, the members 41 and 43 being secured together toward the outer periphery thereof, in a manner well known in the art. Attached in some suitable manner to the cover member 43 is a radiator cooling fan F, shown only fragmentarily in FIG. 1.

The forward portion of the input shaft 25 functions as a support for the inner race of a double row ball bearing set 45, which in turn, is seated on the inside diameter of the housing member 41. The housing member 41 and the cover member 43 cooperate to define a fluid operating chamber 47. Thus, the input coupling member 35 is disposed within the operating chamber 47.

The input coupling member 35 includes a cover member 49, which is preferably a stamped member, retained against the forward surface of the input member 35 by means of a rollover at the outer periphery of the cover 49. The radially inner portion of the input member 35 cooperates with the cover member 49 to define a fluid reservoir 51, such that the viscous coupling 11 is of the "reservoir-in-clutch" type. The cover member 49 defines a fill port 53 which is selectively covered or uncovered by means of a valve arm 55, in a manner generally well known to those skilled in the art. The valve arm 55 is of the rotary type, and in the subject embodiment is rotated by means of a valve shaft 57 which extends through a cylindrical opening defined by the input shaft 25. The valve shaft 57 has the valve arm 55 fixed to the front end of the valve shaft 57, to rotate in unison therewith.

Rotation of the valve arm 55 and the valve shaft 57 may be achieved by means of a suitable rotary actuator, schematically shown at 59, the details of which form no part of the present invention. Typically, the actuator 59 would include an electromagnetic coil 59c, and would operate in response to changes in an electrical input signal, as represented in FIG. 1 by a pair of electrical leads 60. However, the present invention is not limited to any one particular actuator arrangement. Those skilled in the art will understand that the fill port 53 and the valve arm 55 may have any of the configurations typically well known to those skilled in the art, and those configurations, in turn, determine the amount of rotation which must be provided by the rotary actuator 59 to the valve shaft 57 and valve arm 55.

The input coupling member 35 includes a rearward surface which cooperates with an adjacent surface of the housing member 41 to define a plurality of interdigitated lands and grooves in a manner well known to those skilled in the art. Similarly, the forward surface of the input member 35 cooperates with an adjacent surface of the cover member 43 to define a plurality of interdigitated lands and grooves. In each case, the lands and grooves define a serpentine-shaped viscous shear space therebetween which, for purposes of subsequent description will also bear the reference numeral "47", which was introduced previously for the fluid operating chamber.

The housing 41 and cover member 43 cooperate to define a pumping element 61 disposed radially adjacent the outermost periphery of the input coupling member 35. Fluid which is "pumped" or "scavenged" from the outer periphery of the operating chamber 47 (viscous shear space) is communicated by means of an angled passage 63 to a radially inwardly extending passage 65.

Figure 2:
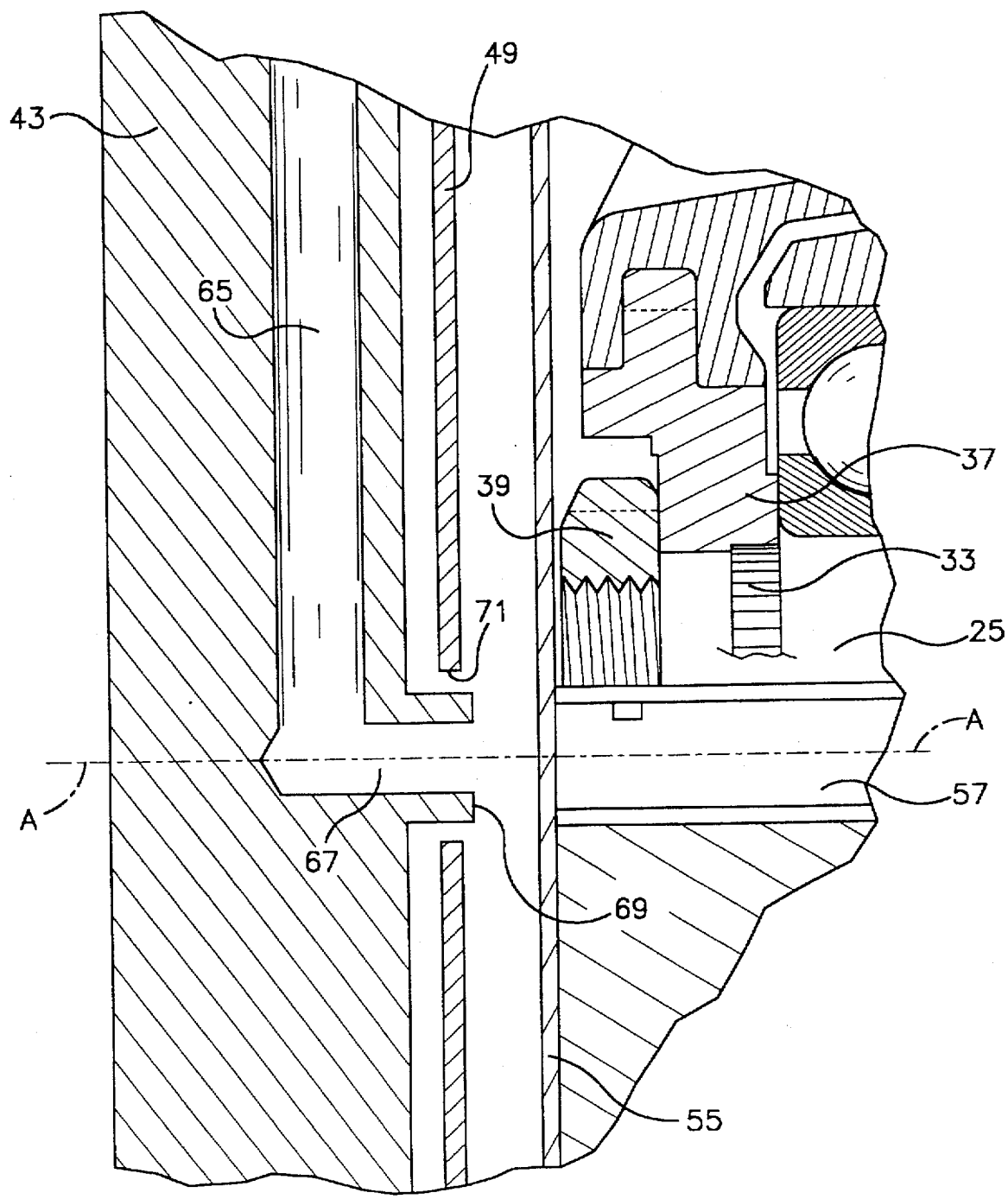
FIG. 2 is an enlarged, fragmentary, axial cross-section, similar to FIG. 1, illustrating one feature of the present invention.

Referring now to FIG. 2 in conjunction with FIG. 1, the radial passage 65 extends inwardly until it communicates with a short, axially extending passage 67, which is defined, in part, by a generally cylindrical portion 69 which projects rearwardly from the cover member 43. The cylindrical portion 69 is disposed such that the axially extending passage 67 is generally concentric with, and juxtaposed to an axis of rotation A of the coupling 11, the pulley 13, and the input shaft 25. Preferably, the cylindrical portion 69 extends rearwardly a sufficient distance to pass through a circular central opening 71 formed in the cover member 49. Thus, fluid which is pumped from the outer periphery of the operating chamber 47 flows through the passages 63 and 65, then flows axially through the passage 67 and enters the fluid reservoir 51 at approximately the axis of rotation A. The fluid then flows radially outward to form a fluid meniscus about the outer periphery of the reservoir 51, thus to be in a position from where it can flow through the fill port 53 and out into the operating chamber 47, during those times that the fill port 53 is uncovered by the valve arm 55.

Thus, the present invention provides a fluid coupling device which is of the reservoir-in-clutch type, and thus is suitable for heavy duty applications which require very low idle speed. The fact that the reservoir 51 is always rotating at input speed means that, even after the fan drive output has been operating at a very low speed, opening the valve arm 55 will result in relatively rapid flow of fluid from the fast turning reservoir 51 into the much slower turning operating chamber 47.

One of the problems with prior art reservoir-in-clutch devices has been the tendency for fluid to "bleed back" and flow from the reservoir into the operating chamber while the fan drive is at rest, thus leading to the problem of "morning sickness", wherein a substantial amount of fluid would be disposed in the operating chamber when the vehicle engine is first operated after a time of shutdown, and the fan would rotate at a much higher speed than would be required, in view of the lack of need for cooling upon engine startup.

This condition results in substantial wasted engine horsepower, and an undesirable noise level. It is one important feature of the present invention that the fluid discharge and return flow path described previously overcomes the above-described disadvantage of prior art reservoir-in-clutch designs. The location of the passage 67 and cylindrical portion 69 are such that, when the engine is shut down, regardless of the rotational orientation of the fan drive 11, fluid will remain in the reservoir chamber 51, and there will be no flow path by means of which the fluid can flow from the reservoir 51 back into the operating chamber. The above statement is based upon the assumption that the reservoir chamber 51 is sized such that, when all of the fluid within the fan drive is disposed in the reservoir, and the fan drive is at rest, the fluid level is still below the circular opening 71.

It will be understood by those skilled in the art that, in view of the fact that discharge fluid is being pumped all the way, radially inwardly, to the axis of rotation A, the pump out arrangement being utilized must be capable of pumping fluid fairly efficiently. However, it is believed that appropriately efficient pump out arrangements are within the ability of those skilled in the art.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A fluid coupling device of the type including a first rotatable coupling member defining an axis of rotation, first enclosure means associated with said first coupling member to define a fluid operating chamber therein; a second rotatable coupling member disposed in said fluid operating chamber and second enclosure means associated with said second coupling member to define a fluid reservoir chamber therein; said first and second coupling members cooperating to define a viscous shear space therebetween, and in communication with said fluid operating chamber; input shaft means operable to transmit input torque to said second coupling member; said second enclosure means defining a fluid fill port, and a valve arm moveable between one position blocking fluid communication through said fill port, and another position permitting fluid communication from said reservoir chamber through said fill port to said operating chamber; actuator means operably associated with said valve arm, and with said input shaft means to move said valve arm between said one position and said another position in response to an input signal; said first coupling member including means operable to pump fluid from said operating chamber to said reservoir chamber in response to relative rotation between said first and second coupling members; characterized by:

(a) said valve arm being disposed in said fluid reservoir chamber, and rotatable about said axis of rotation; and (b) said means operable to pump fluid including said first coupling member defining a discharge passage communicating fluid from said operating chamber, adjacent the outer periphery thereof, to said reservoir chamber at a location juxtaposed to said axis of rotation.

2. A fluid coupling device as claimed in claim 1, characterized by said actuator means including a rotatable shaft member fixed to said valve arm, and having its axis of rotation substantially coincidental with said axis of rotation of said first coupling member.

3. A fluid coupling device as claimed in claim 2, characterized by said actuator means further being of the type including an electromagnetic coil adapted to rotate said shaft member in response to an electrical input signal.

4. A fluid coupling device as claimed in claim 1, characterized by said second enclosure means comprising a plate like member defining said fluid fill port and further defining a central opening, approximately concentric about said axis of rotation, said discharge passage defined by said first coupling assembly including an axially-extending passage portion having a discharge opening disposed immediately adjacent said central opening.

5. A fluid coupling device as claimed in claim 4, characterized by said first coupling assembly including a rearwardly-projecting, generally cylindrical portion defining said axially-extending passage portion, said cylindrical portion of said first coupling assembly extending axially into said central opening, said discharge opening being disposed in said reservoir chamber.

6. A fluid coupling device as claimed in claim 1, characterized by said device including a single input shaft having said second coupling member fixed to rotate therewith, said device further including a mounting bracket adapted to be fixed relative to the vehicle engine, and bearing means disposed between said mounting bracket and said single input shaft.

7. A fluid coupling device as claimed in claim 6, characterized by said device including a pulley member including a portion non-rotatably fixed to said single input shaft at a location disposed axially between said second coupling member and said mounting bracket.

* * * * *